United States Patent
Kaza et al.

(10) Patent No.: US 11,544,340 B2
(45) Date of Patent: Jan. 3, 2023

(54) CONTENT ITEM SELECTION IN A DIGITAL TRANSACTION MANAGEMENT PLATFORM

(71) Applicant: DocuSign, Inc., San Francisco, CA (US)

(72) Inventors: Shrinivas Kiran Kaza, Fremont, CA (US); Taiwo Raphael Alabi, San Jose, CA (US); Farzaneh Rajabi, Stanford, CA (US); Ashwath Mohan, San Ramon, CA (US); Kim Cuong Phung, Hayward, CA (US)

(73) Assignee: DOCUSIGN, INC., San Francisco, CA (US)

( * ) Notice: Subject to any disclaimer, the term of this patent is extended or adjusted under 35 U.S.C. 154(b) by 66 days.

(21) Appl. No.: 17/122,787

(22) Filed: Dec. 15, 2020

(65) Prior Publication Data

US 2022/0188371 A1    Jun. 16, 2022

(51) Int. Cl.

| | |
|---|---|
| *G06F 7/02* | (2006.01) |
| *G06F 16/00* | (2019.01) |
| *G06F 16/9538* | (2019.01) |
| *G06Q 10/10* | (2012.01) |
| *G06F 16/93* | (2019.01) |
| *G06F 16/2457* | (2019.01) |
| *G06F 3/0482* | (2013.01) |
| *G06F 16/9535* | (2019.01) |
| *G06N 20/00* | (2019.01) |

(Continued)

(52) U.S. Cl.
CPC ........ *G06F 16/9538* (2019.01); *G06F 3/0482* (2013.01); *G06F 9/451* (2018.02); *G06F 16/24578* (2019.01); *G06F 16/93* (2019.01); *G06F 16/9535* (2019.01); *G06F 40/166* (2020.01); *G06N 20/00* (2019.01); *G06Q 10/10* (2013.01)

(58) Field of Classification Search
CPC ...... G06F 16/9538; G06F 9/451; G06F 16/93; G06F 16/9535; G06F 16/24578; G06F 40/166; G06F 3/0482; G06N 20/00; G06Q 10/10
See application file for complete search history.

(56) References Cited

U.S. PATENT DOCUMENTS

2002/0107853 A1* 8/2002 Hofmann .............. G06F 16/335
2005/0022114 A1* 1/2005 Shanahan ............... G06F 21/10
715/234

(Continued)

*Primary Examiner* — Bruce M Moser
(74) *Attorney, Agent, or Firm* — Fenwick & West LLP

(57) ABSTRACT

A centralized document system identifies content items for presentation to a user based initially on a cold-start algorithm and subsequently based on machine-learned models. The system detects a first access by the user. The system generates a user attribute vector for the user and a content vector for each content item. The system selects a first content item based on the initial cold-start algorithm and modifies a user interface to include the first content item. The system identifies an interaction with the first content item by the user. The system detects a second access by the user. The system selects a machine-learned model based on a set of interactions by the user with displayed content items. The system applies the selected machine-learned model to the set of interactions and the user attribute vector to identify a second content item and modifies the user interface to include the second content item.

17 Claims, 5 Drawing Sheets

(51) Int. Cl.
  *G06F 40/166* (2020.01)
  *G06F 9/451* (2018.01)

(56) References Cited

U.S. PATENT DOCUMENTS

| | | | |
|---|---|---|---|
| 2011/0179118 A1* | 7/2011 | Dean | G06F 16/9535 709/204 |
| 2015/0324454 A1* | 11/2015 | Roberts | G06F 16/3349 707/734 |
| 2017/0103343 A1* | 4/2017 | Yee | G06F 16/248 |
| 2021/0377611 A1* | 12/2021 | Bress | H04N 21/6582 |

\* cited by examiner

CONTENT ITEM SELECTION IN A DIGITAL TRANSACTION MANAGEMENT PLATFORM

TECHNICAL FIELD

The disclosure generally relates to the field of content item selection, and specifically to solving a cold-start problem of content item selection in a digital transaction management platform.

BACKGROUND

A digital transaction management platform manages and provides various content items to users of the platform for users to interact with. As users interact with content items, the digital transaction management platform may learn from the interactions and provide subsequent content items to the users with which the users may be more inclined to interact. However, when a user is new to the digital transaction management platform and the platform has little to no interaction data with which to determine which content items to present to the user, the digital transaction management platform can be said to suffer from a cold-start problem (which may result in presenting content items of little to no interest to the user). To solve the cold-start problem, conventional digital transaction management platforms may randomly provide content items to new users or provide current most-popular content items to new users. However, these platforms do not use intelligent analyses of user characteristics and content item characteristics to select content items initially for presentation and, once interaction data becomes available, do not seamlessly transition to one or more deep-learning models to select subsequent content items for presentation. To more accurately select content items of interest for presentation to users of a digital transaction management platform, there is a need for a system that solves the cold-start problem initially, and then transitions to deep-learning models based on user characteristics, content item characteristics, and interaction data as this information becomes available.

SUMMARY

A system (e.g., a centralized document system) and method for selecting content items for presentation to a user of a document management environment is described herein. In an initial operating mode, an initial content is selected based on characteristics of the user and content item characteristics of a plurality of content items. In a subsequent operating mode, a subsequent content item is selected based on at least user characteristics of the user and interactions of the user with content items. A seamless transition may occur between an initial algorithm (e.g., an initial cold-start algorithm) used to determine the initial content item(s) to display to the user and a deep-learning model (e.g., a trained machine-learned model) used to determine the subsequent content item(s) to display to the user.

A first access by a user to the centralized document system is detected. For example, the user may have not previously accessed the centralized document system. A user attribute vector for the user is generated, where each user attribute vector entry corresponds to a characteristic of the user. A content vector associated with each of a plurality of content items is generated, where each content vector entry corresponds to a characteristic of the associated content item. A first content item of the plurality of content items is selected based on the user attribute vector and the content vectors (e.g., based on a number of matches between the user attribute vector and the content vector of the first content item). A user interface displayed to the user is modified to include the first content item. An interaction by the user with the first content item is identified. A second access by the user to the centralized document system is detected. One of a plurality of machine-learned models is selected based on a set of interactions by the user with displayed content items within the centralized document system. The set of interactions includes the identified interaction taken by the user with the first content item. Each machine-learned model is configured to select content items based on user interactions and user characteristics. The selected machine-learned model is applied to the set of interactions and the user attribute vector to identify a second content item of the plurality of content items. The user interface displayed to the user is modified to include the second content item.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

As noted above, cold start issues can prevent systems from presenting relevant content to new users (users for which little to no preference information or user behavior is known). In such instances, content most likely to be relevant to users can be selected based on what is known about the users and what is known about the content. As additional information representative of a user's behavior and characteristics is learned, content recommendation can transition from the initial cold start algorithm to a best-performing machine-learned recommendation engine, as described below.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

Figure 1:
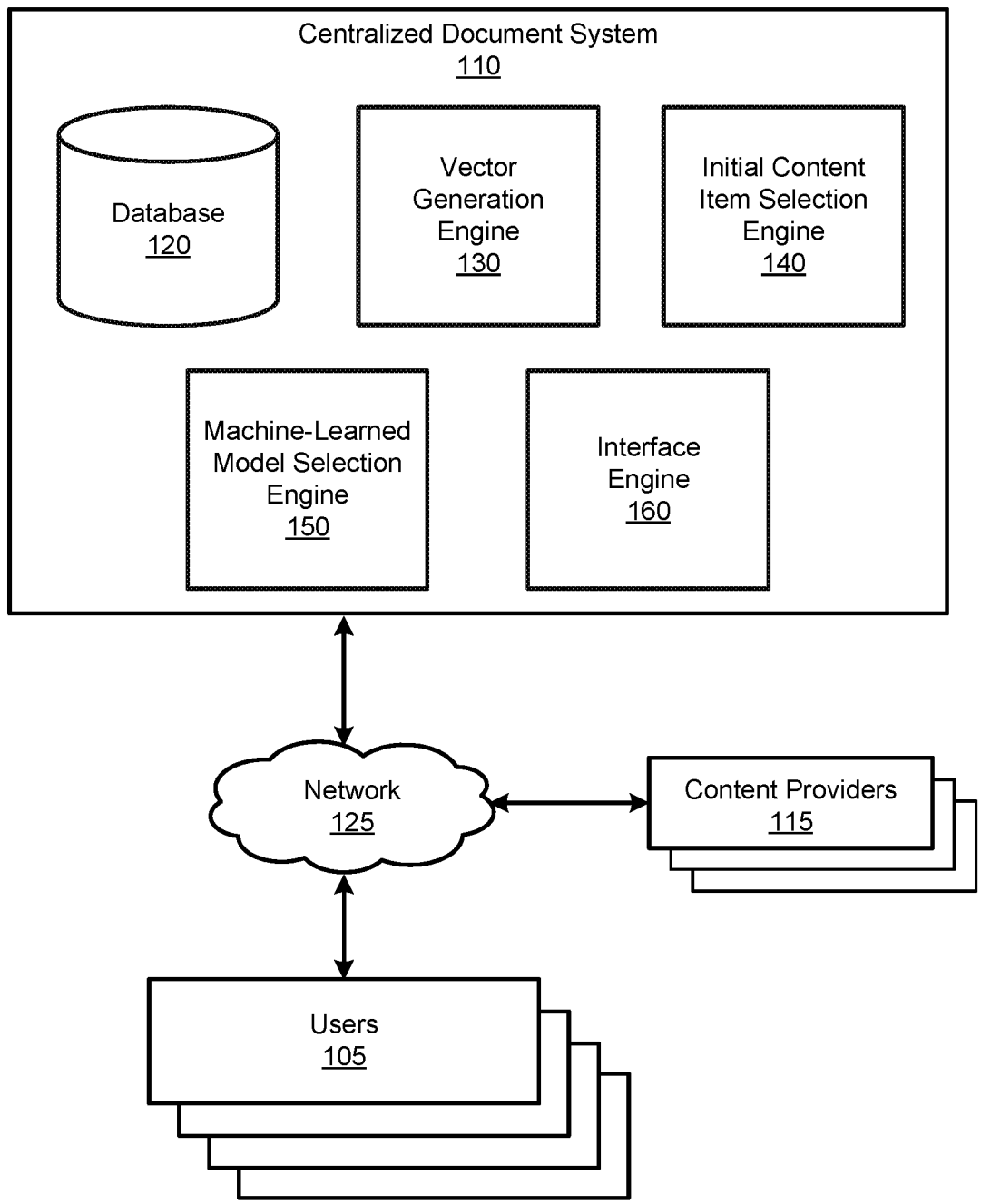
FIG. 1 is a block diagram of a system environment in which a centralized document system operates, in accordance with one or more embodiments.

FIG. 1 is a block diagram of a system environment 100 in which a centralized document system 110 operates, in accordance with one or more embodiments. As described above, the system environment 100 enables one or more content providers 115 to provide content items to the centralized document system 110, and the centralized document system 110 identifies which of the content items to present to each user 105 of the centralized document system 110. The users 105 may interact with the content items via the centralized document system 110. The system environment 100 may initially use a cold-start algorithm to identify which of the content items to present to the users 105 and may subsequently use one or more machine-learned models to identify which of the content items to present to the users 105. As illustrated in FIG. 1, the system environment 100 includes a centralized document system 110, a plurality of users 105, and a plurality of content providers 115, each communicatively interconnected via a network 125. In some embodiments, the system environment 100 includes components other than those described herein. For the purposes of concision, the web servers, data centers, and other components associated with a system environment 100 are not shown in the embodiment of FIG. 1.

The system environment 100 described herein can be implemented within the centralized document system 110, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

The users 105 and the content providers 115 communicate with the centralized document system 110 via one or more computing devices capable of receiving user input as well as transmitting and/or receiving data via the network 125. Examples of computing devices include conventional computer systems (such as a desktop or a laptop computer, a server, a cloud computing device, and the like), client devices (such as smartphones, tablet computers, mobile devices, and the like), or any other suitable device performing computer functions. The devices of the users 105 and the content providers 115 are configured to communicate with the centralized document system 110 via the network 125, for example using a native application executed by the devices or through an application programming interface (API) running on a native operating system of the devices, such as IOS® or ANDROID™. In another example, the devices of the users 105 and the content providers 115 are configured to communicate with the centralized document system 110 via an API running on the centralized document system 110.

It should be noted that when reference is made to a user 105 or a content provider 115 performing an action within the system environment 100 of FIG. 1, in practice it may be a device of the user 105 or the content provider 115, respectively, that is performing the action, for instance at the direction of the user 105 or the content provider 115.

Users 105 can include any entities associated with accounts of the centralized document system 110. For instance, a user 105 may be an individual, an employee, an employer, a representative of a company or organization, and the like. As one example, an employer of 50 employees may be associated with an employer account within the centralized document system 110, and may provide employee information (such as name, title, biographic information, geographic information, and the like) for each employee to the centralized document system 110. The centralized document system 110, in turn, may provision an account through the centralized document system 110 for each employee, and thus each employee may also be a user 105.

The content providers 115 provide content items and/or other information to the centralized document system 110 via the network 125. A content provider 115 may be a third-party (e.g., an advertiser, a technology partner such as an integration or IT provider, etc.), a representative of the company or organization providing the centralized document system 100, or any other suitable service or product provider. In some embodiments, the content providers 115 are associated with an account of the centralized document system 110. Content items provided by the content providers 115 to the centralized document system 110 may include graphical widgets, reminders, files, text, images, video, workflow content, recommendations (e.g., for learning more about features of centralized document system 110, upgrade options, etc.), coupons, discount opportunities, advertisements, any other suitable content, or any combination thereof. Each content item includes at least one interface element such as a link and/or a button providing a means for interacting with the content item.

Other information provided by the content providers 115 to the centralized document system 110 may include content item characteristics. In some embodiments, content providers 115 may provide one or more weights to be associated with a corresponding content item characteristic. A weight may be a positive, negative, fractional, or whole number value. For example, a content provider 115 may provide multiple content item characteristics along with the content item to the centralized document system 110. The content provider 115 additionally may provide a first weight (e.g., a positive whole number value) to be associated with a first content item characteristic and a second weight (e.g., a negative whole number value) to be associated with a second content item characteristic. In such embodiments, the first content item characteristic is determined by the content provider to be of more importance than the second content item characteristic. In some embodiments, the content items provided by the content providers 115 are sponsored content items for which the content providers 115 provide remuneration to the centralized document system 110 for distributing the content items.

The centralized document system 110, the users 105, and the content providers 115 are configured to communicate via the network 125, which may comprise any combination of local area and/or wide area networks, using wired and/or wireless communication systems, such as the Internet. In one embodiment, the network 125 uses standard communications technologies and/or protocols. For example, the network 125 includes communication links using technologies such as Ethernet, 802.11, 3G, 4G, code division multiple access (CDMA), digital subscriber line (DSL), etc. Examples of networking protocols used for communicating via the network 125 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 125 may be represented using any suitable format, such as hypertext markup language (HTML) or extensible markup language (XML). The network 125 may include encryption capabilities to ensure the security of customer data. For example, encryption technologies may include secure sockets layers (SSL), transport layer security (TLS), virtual private networks (VPNs), and Internet Protocol security (IPsec), among others.

The centralized document system 110 is configured to receive and store various information associated with one or more entities, such as the users 105 and the content providers 115. As described below, the centralized document system 110 is able to identify one or more content items for presentation to the users 105 (e.g., by utilizing an initial cold-start algorithm and machine-learned models). The centralized document system 110 is able to leverage information stored by the centralized document system 110 associated with the users 105 and the content items in order to select the content items for presentation.

In the embodiment of FIG. 1, the centralized document system 110 includes a database 120, a vector generation engine 130, an initial content item selection engine 140, a machine-learned model selection engine 150, and an interface engine 160. It should be noted that in other embodiments, the centralized document system 110 can include fewer, additional, or different components that those illustrated herein. In addition, in the embodiment of FIG. 1, the centralized document system 110 is associated with an entity (such as a company or organization) different from the users 105 and the content providers 115. In other embodiments, one or more of the content providers 115 may be associated with the entity associated with the centralized document system 110. Accordingly, the centralized document system 110 includes hardware (such as servers, networking equipment, databases or other storage devices, data center systems, and the like) distinct (and in some embodiments, physically remotely from the devices associated with the users 105 and the content providers 115.

The database 120 is configured to store characteristics associated with the users 105. In some embodiments, the user characteristics stored in the database 120 is information gathered from the users 105 as these entities are establishing accounts with the centralized document system 110. For instance, the centralized document system 110 can be an online document management system that provides document execution software to employers for use with employees. In this example, the employer may provide user characteristics describing characteristics of the employer and describing characteristics of each of the employees to the centralized document system 110 during the course of provisioning accounts for the employees with the centralized document system 110. In other embodiments, user characteristics associated with the users 105 can be provided to the centralized document system 110 for storage in the database 120 via any other suitable source or medium.

Examples of user characteristics associated with a user 105 stored by the database 120 can include but are not limited to: a type or category of the user (e.g., a company, an educational institution, a professional or charitable association, an employer, an employee, a government organization, and the like), an age of the user (e.g., how long the user has been in business, been established, etc.), a number of individuals or headcount associated with the user 105, expertise of the user 105 (e.g., tax or finance issue expertise, industry expertise, fundraising or selling expertise, non-profit expertise, grant expertise, R&D expertise, and the like), services offered by the user 105, a service type associated with the user (e.g., an automated service, personal/hand-holding service, and the like), an industry or focus associated with the user, software used by the user 105, a state of incorporation or registration of the user 105, cities or states in which the user 105 is present (e.g., does business, has offices, etc.), cities or states in which the user 105 has employees, addresses associated with the user 105 (e.g., addresses of offices of the user 105), geographic locations of customers of the user 105, or any other suitable characteristic of the user 105.

The database 120 is configured to store content item characteristics associated with content items and other information (e.g., weights) provided by the content providers 115. Content item characteristics correspond to properties of a particular content item. In some embodiments, the content item characteristics stored in the database 120 is information provided by the content providers 115 as the content providers 115 are establishing accounts with the centralized document system 110. In other embodiments, content item characteristics associated with content items can be provided to the centralized document system 110 for storage in the database 120 via any other suitable source or medium.

Examples of content item characteristics associated with a content item and stored by the database 120 can include but are not limited to: one or more industries associated with the content item, one or more demographics associated with the content item, one or more expertise associated with the content item, one or more geographic locations associated with the content item, services described in the content item, products described in the content item, categories of content within the content item (e.g., images, videos, and the like), or any other suitable characteristic of the content item.

The database 120 is configured to store interaction data associated with each user 105. Interaction data corresponds to any interaction a user 105 has with content items presented to the user 105. In some embodiments, the database 120 is updated with new interaction data every time an interaction between a user 105 and content item takes place. Examples of interaction data stored by the database 120 include which content item the user 105 interacted with, what type of interaction took place (e.g., selection of a link by the user 105, selection of a button by the user 105, playback of the content item, making a purchase, etc.), was the interaction positive or negative (e.g., positive interactions may include likes, subscriptions, views, purchases, etc. or negative interactions may include dislikes, deletions, dismisses, etc.), when an interaction with a content item took place, an amount of time between a content item being displayed to a user 105 and an interaction with the content item taking place, or any other suitable interaction data.

The database 120 includes one or more sets of training data used to train one or more machine-learned models. In some embodiments, the set of training data includes data associated with each user 105, data associated with each content item, and interaction data associated with each user 105. For instance, the set of training data can include multiple entries, with each entry including information describing user characteristics of a user 105 (e.g., a user attribute vector), information describing content item characteristics of content items (e.g., content vectors) presented to the user 105, and information describing any interaction between the user 105 and the content items.

The vector generation engine 130 generates a user attribute vector for each user 105 and a content vector for each content item. Each vector includes one or more vector entries and a vector entry may be a scalar value or a vector itself. The user attribute vector includes one or more user attribute vector entries where each user attribute vector entry corresponds to a user characteristic. For example, a user attribute vector entry representing a headcount of the user 105 may be a literal number of employees or a number representing the number of employees of the user 105 relative to other numbers of employees of other users 105. The vector generation engine 130 accesses the database 120 to generate the user attribute vector for each user 105. The content vector for each content item includes one or more content vector entries where each content vector entry corresponds to a content item characteristic. In some embodiments, one or more content vector entries include an associated weight (e.g., a weight provided by the content provider and associated with the content item characteristic). The vector generation engine 130 accesses the database 120 to generate the content vector for each content item.

The initial content item selection engine 140 is configured to select a first content item for presentation to the user 105 based on the user's corresponding user attribute vector and the content item vectors. In some embodiments, the initial content item engine 140 determines to select the first content item based on the initial content item engine 140 detecting a first access by the user 105 to the centralized document system 110. In some embodiments, the first access may be a first login to an account of the user 105 after establishing the account with the centralized document system 110. In some embodiments, the first access may be any login to their account prior to the user 105 interacting with any presented content items. For example, a first access is any login to the user account prior to any interaction data being stored in the database 120 for the particular user 105. In alternative embodiments, a first access may be a user that has not been targeted previously by the machine-learned model or the initial content item selection engine The initial content item selection engine 140 may utilize an initial cold-start algorithm to determine which content item to present to the user 105 first (e.g., during the user's first access to the centralized document system 110). For example, during implementation of the initial cold-start algorithm (e.g., a cosine similarity algorithm), the initial content item selection engine 140, for each content vector, determines one or more matches between a user attribute vector entries of the user attribute vector and the content vector entries of the content vector. The initial content item selection engine 140 may rank the plurality of content items based on the determined number of matches. For example, a user attribute vector may include entries corresponding to user characteristics that include a number of individuals associated with the user 105, expertise of the user 105, and states in which the user 105 is present. The initial content item selection engine 140 ranks a particular content item that has a corresponding content vector with entries that match all three of the user attribute vector entries higher than a different content item that has a corresponding content vector with entries only matching one of the user attribute vector entries.

In some embodiments, the initial content item selection engine 140 may apply a weight to one or more content vector entries of a content vector, some content vectors, or all content vectors. For example, the initial content item selection engine 140 may apply a weight to a content vector entry corresponding to a content item characteristic about an industry associated with the content item such that this particular content vector entry is of greater importance than other content vector entries in the content vector. In some embodiments, the initial content item selection engine 140 may update (e.g., increase or decrease) a weight previously associated with one or more content vector entries of a content vector, some content vectors, or all content vectors.

The initial content item selection engine 140 may take into consideration the weight(s) applied to one or more content vector entries when determining one or more matches between attribute vector entries of a user attribute vector and the content vector entries of the content vectors. For example, the initial content item selection engine 140 may rank a content item higher or lower depending on if one or more of the matches includes a match between a content vector entry with an associated weight and a user attribute vector entry. In some embodiments, the initial content item selection engine 140 may determine the user attribute vector does not contain a user attribute vector entry that matches to a weighted content vector entry. In these embodiments, the initial content item selection engine 140 may remove the weighted content vector entry from the content vector and proceed with determining one or more matches between attribute vector entries of the user attribute vector and the remaining content vector entries of the content vectors and ranking the content items based on the number of matches. In such embodiments, the initial content item selection engine 140 may favor or weight content associated with content vectors that do not have removed entries relative to content associated with content vectors that do have removed entries.

In some embodiments, the initial content item selection engine 140 selects a top-ranked content item as the first content item to present to the user 105. In some embodiments, the initial content item selection engine 140 selects a number of the top ranked content items to present to the user 105. For example, the initial content item selection engine 140 may select the top three, top five, etc. to present to the user 105. The initial content item selection engine 140 provides the content item(s) to the interface engine 160 for presentation to the user 105.

The machine-learned model selection engine 150 is configured to train one or more machine-learned models to select one or more content items for presentation to the user 105. In some embodiments, the machine-learned model selection engine 150 performs operations (e.g., training the machine-learned models, monitoring a performance of each machine-learned model, etc.) in advance or in response to identifying an opportunity to present content to a user. The one or more machine-learned models may include a deep and wide neural network, a deep factorization machine neural network, a graph-based neural network, a reinforcement learning model, any other suitable machine-learned model, or any combination thereof.

The machine-learned model selection engine 150 trains the machine-learned models on a training set of historic data. The training set of historic data includes one or more of: the user characteristics of the user 105, the content item characteristics, and interaction data stored in the database 120. In some embodiments, the machine-learned models are trained on the set of training data in order to identify one or more content items that, if presented to a user 105, are most likely to be interacted with by the user 105. In some embodiments, the machine-learned models are trained to identify patterns or correlations between one or more of: content item characteristics of a set of content items, user characteristics of a user 105 presented with the set of content items, and which content items of the set the user 105 interacted with. The machine-learned model selection engine 150 may train the machine-learned models initially based on the training set of historic data, and may retrain the machine-learned models when the training set of data is updated (e.g., new information is added to the training set, new content items are provided to the centralized document system 110, one or more user characteristics has changed, and the like). The machine-learned models may be retrained by the machine-learned model selection engine 150 periodically, after the passage of a threshold amount of time, after the occurrence of a triggering event, at the request of a user or other entity associated with the centralized document system 110, continually, and the like.

The machine-learned model selection engine 150 applies each trained machine-learned model of the one or more machine-learned models to the user attribute vector and content vectors generated by the vector generation engine 130. Each machine-learned model identifies subsequent content item(s) of the plurality of content items to present to the user.

The machine-learned model selection engine 150 determines a predictive performance of each of the machine-learned models based on the interaction data stored in the database 120 for the user. For example, the machine-learned model selection engine 150 determines how many content items identified by a machine-learned model the user 105 actually interacts with compared to how many content items were identified by the machine-learned model overall. The machine-learned model selection engine 150 may monitor the predictive performance of each of the machine-learned models over time. The machine-learned model selection engine 150 may select a best performing machine-learned model of the plurality of machine-learned models at any time.

The machine-learned model selection engine 150 applies the best performing or most predictive machine-learned model to the user attribute vector and content vectors to select subsequent content item(s) to present to the user 105. In some embodiments, the machine-learned model selection engine 150 selects subsequent content items based on the machine-learned model selection engine 150 detecting a second access by the user 105 to the centralized document system 110. In some embodiments, the second access may be a second or any subsequent login to an account of the user 105 after the first access.

The best-performing machine-learned model is utilized by the centralized document system 110 instead of the initial cold-start algorithm to identify one or more content items to present to the user 105. At any time, the machine-learned model selection engine 150 may reevaluate the performance of the machine-learned models and determine a different machine-learned model is a better performing model. As such, the machine-learned model selection engine 150 begins using the better performing machine-learned model to select which content item(s) to present to the user.

The interface engine 160 coordinates communications between the entities of FIG. 1. For instance, the interface engine 160 receives information describing user characteristics of the users 105 (for instance, while onboarding and provisioning accounts within the centralized document system 110 for these entities) and stores the received information in the database 120. Likewise, the interface engine 160 receives information describing content item characteristics of content items from the content providers 115 (for instance, while onboarding and provisioning accounts within the centralized document system 110 for the content providers 115) and stores the received information in the database 120. The interface engine 160 may receive information describing interactions a user 105 has with presented content items and may store the received information in the database 120. The interface engine 160 can provide one or more content items to the users 130. In some embodiments, the interface engine 160 generates and causes display of one or more graphic user interfaces (GUIs), for instance for display by a device of a user 105 and/or a device of a content provider 115.

Upon receiving the selected one or more initial or subsequent content items to present to a user 105 (e.g., from the initial content item selection engine 140 or the machine-learned model selection engine 150, respectively), the interface engine 160 causes display of the content item(s) within an interface displayed by a device associated with the user 105. In some embodiments, the interface displayed by the device associated with the users 105 includes a GUI displayed by an application executed by the device and associated with the centralized document system 110. In some embodiments, the interface includes one or more interface elements (for instance, a link or a button) that, when interacted with, causes a new content item to be presented or a new window to open. In some embodiments, the interface includes one or more interface elements that, when interacted with, causes a dismissal of the corresponding content item (i.e., a removal of the content item from the display). In some embodiments, instead of a content item displayed within an interface of an application associated with the centralized document system 110, the content item can be emailed, texted, or otherwise communicated to the user 105 for display within a different interface by a device associated with the user 105.

Data Flow of Centralized Document System

Figure 2:
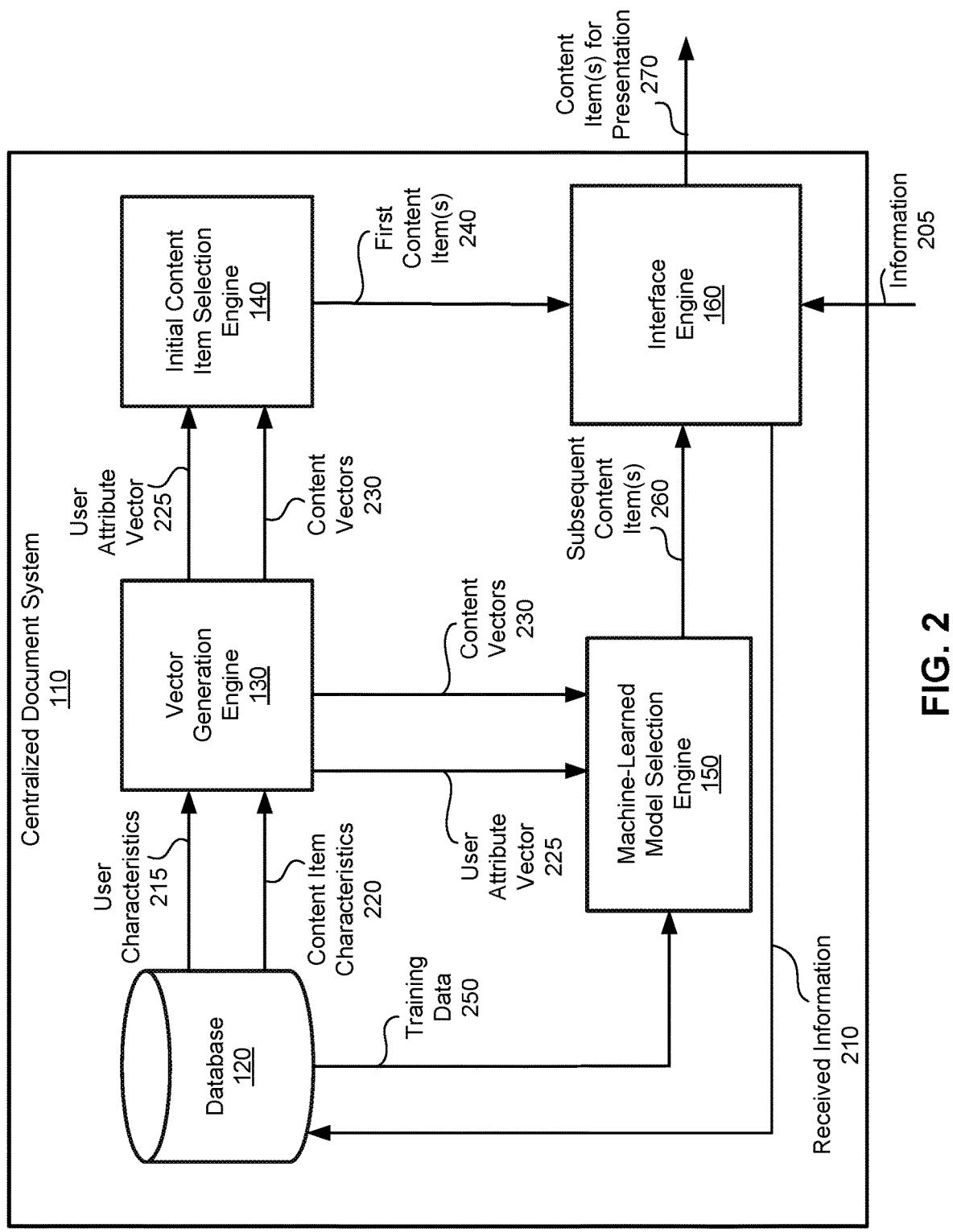
FIG. 2 is a data flow diagram illustrating the identification of content items for presentation to a user of a centralized document system, in accordance with one or more embodiments.

FIG. 2 is a data flow diagram 200 illustrating the identification of content items for presentation to a user 105 of a centralized document system 110, in accordance with one or more embodiments. The interface engine 160 of the centralized document system 110 receives information 205 from the user 105 and from content providers 115. The information 205 from the user may include user characteristics 215 and/or user interactions with presented content items and the information 205 from the content providers 115 may include content items and corresponding content item characteristics 220 for each content item. The interface engine 160 provides the information 205 as received information 210 to the database 120 for storage. The vector generation engine 130 receives the user characteristics 215 and the content item characteristics 220 from the database 120. The vector generation engine 130 generates a user attribute vector 225 and a plurality of content vectors 230 (e.g., one content vector for each content item) based on the received user characteristics 215 and content item characteristics 220. The user attribute vector 225 includes user attribute vector entries. Each user attribute vector entry is a numerical value (e.g., a scalar value or a vector) representing a user characteristic. A user characteristic describes biographical, demographical, geographical, or other information about the user. Each content vector includes content vector entries. Each content vector entry can be a numerical or other value representing a content item characteristic. A content item characteristic corresponds to a property of the content item.

The initial content item selection engine 140 receives the user attribute vector 225 and the content vectors 230 from the vector generation engine 130 and selects a first content item 240 or first content items 240 (e.g., by implementing an initial cold-start algorithm). For example, the initial content item selection engine 140 determines, for each content vector, a number of matches between the user attribute vector entries and the content vector entries. In some embodiments, one or more content vector entries are associated with a weight. The weight(s) may have been designated by the centralized document system 110, the content provider who provided the content item to the centralized document system 110, or a combination of both.

The initial content item selection engine 140 may rank the content items based on a number of matches between entries of a user attribute vector 225 and each of a plurality of content vectors 230, such that the greater number of entry matches between vectors corresponds to a higher ranked content item. In some embodiments, matches between weighted content vector entries and user attribute vector entries potentially increase or decrease the rank of a corresponding content item. In some embodiments, the initial content item selection engine 140 may remove a weighted content vector entry of a content vector if there is no corresponding match to a user attribute vector entry of the user attribute vector. The initial content item selection engine 140 selects one or more first content items 240 based on the rank of the content items. For example, the initial content item selection engine 140 may select a top-ranking content item or a number of top-ranking content items (e.g., top five content items). The initial content item selection engine 140 provides the first content item(s) 240 to the interface engine 160. The interface engine 160 receives the first content item(s) 240 and displays the content item(s) for presentation 270 to the user 105 via a user interface.

As discussed above, the interface engine 160 receives information 205 from the user 105 (e.g., user interactions the user 105 has with presented content items). A user interaction may include the user 105 selecting an interface element of the content item (e.g., clicking on a link included in the content item). In some embodiments, the user interaction may be a positive interaction or a negative interaction. The user interactions are included in the received information 210 provided by the interface engine 160 to the database 120 for storage. The database 120 may provide training data 250 (which includes the user interactions stored in the database 120) to the machine-learned model selection engine 150. The machine-learned model selection engine 150 receives the training data 250 and receives the user attribute vector 225 and the content vectors 230 from the vector generation engine 130. The machine-learned model selection engine 150 utilizes one or more of: the training data 250, the user attribute vector 225, and the content vectors 230 to train various machine-learned models. The machine-learned models may include a deep and wide neural network, a deep factorization machine neural network, a graph-based neural network, a reinforcement learning model, and/or any other suitable machine-learned models.

While the machine-learned model selection engine 150 trains the machine-learned models, the initial content item selection engine 140 continues to select first content item(s) 240 and provide the first content item(s) 240 to the interface engine 160 for presentation of the content item(s) to the user 105. The training data 250 is continuously updated based on any new user interactions with presented content items. The user attribute vector 225 and the content vectors 230 are updated based on any new updates to user characteristics 215 and/or any new content items provided to the interface engine 160 via information 205.

Throughout training of the machine-learned models, the machine-learned model selection engine 150 tracks the performance of the machine-learned models by comparing the user interactions (in the training data 250) to predictions made by the machine-learned models, for example by comparing the content items identified by each machine-learned model with the actual user interactions. The machine-learned model selection engine 150 selects a best-performing machine-learned model to replace the initial content item selection engine 140 based on information known about a particular user. The machine-learned model selection engine 150 applies the selected machine-learned model to the user attribute vector 225 and the content vectors 230 to select subsequent content item(s) 260 based on the output of the selected machine-learned model. The selected subsequent content item(s) 260 are provided to the interface engine 160. The interface engine 160 receives the subsequent content item(s) 260 from the machine-learned model selection engine 150. The interface engine 160 displays the content item(s) for presentation 270 to the user 105 via the user interface.

The interface engine 160 continues to receive user interactions via information 205 and provide the user interactions as received information 210 to the database 120. The machine-learned model selection engine 150 continues to receive training data 250 from the database 120 and continues to train machine-learned models. The machine-learned model selection engine 150 continues to monitor the performance of the machine-learned models and at any time may selected a different machine-learned model to be applied to the user attribute vector 225 and the content vectors 230 for selection of future subsequent content item(s) 260. For instance, the machine-learned model selection engine 150 may switch from the initial content item selection engine 140 to a first machine-learned model after a threshold amount of information about a user 105 is obtained, and may switch from the first machine-learned model to a second machine-learned model after additional information about the user 105 is obtained and the second machine-learned model becomes more likely to select content relevant to the user than the first machine-learned model.

Example Presentations of Content Items within Document Management Environment

Figure 3A:
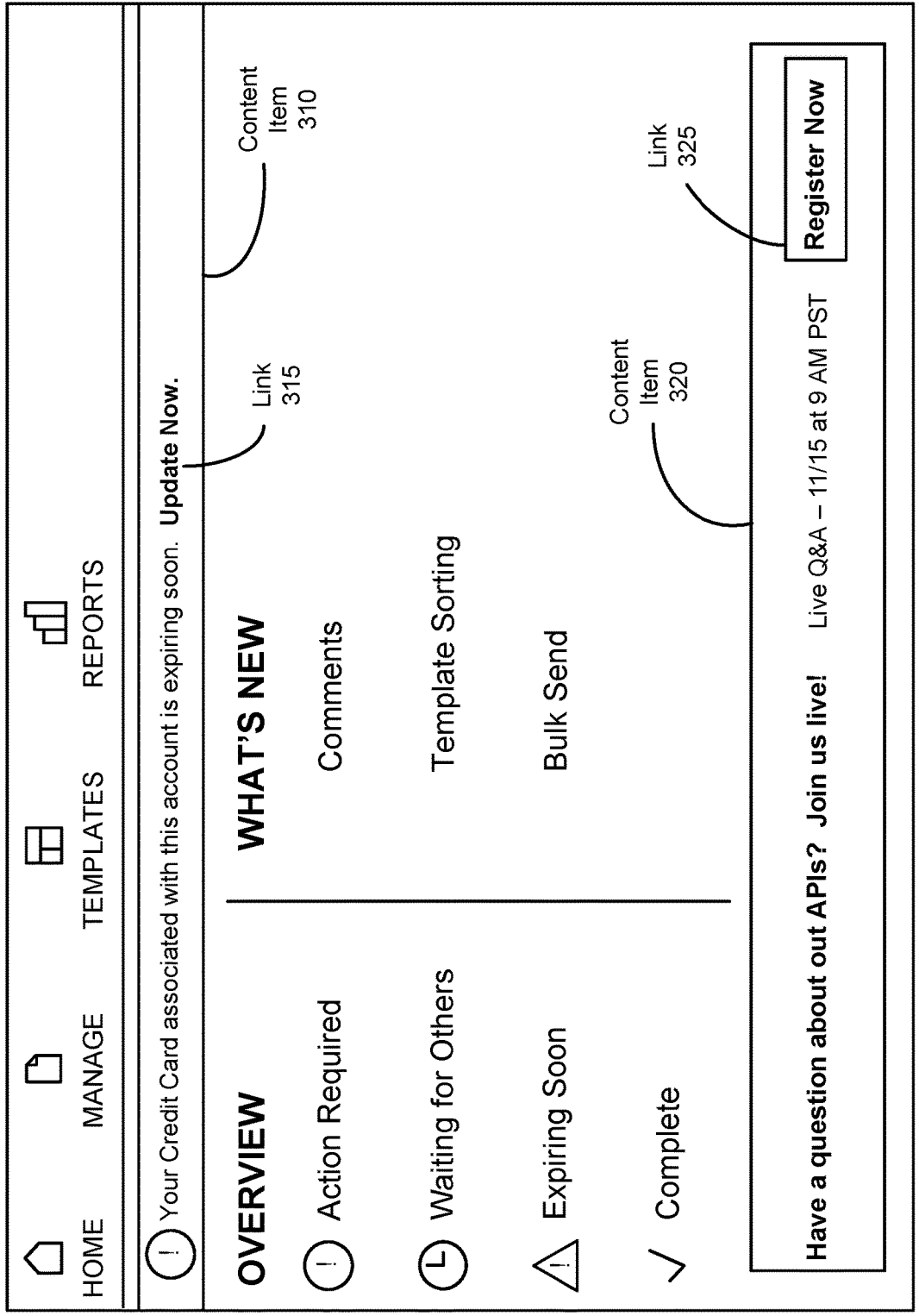
FIG. 3A illustrates an example user interface in which one or more content items may be presented to a user, in accordance with one or more embodiments.

FIG. 3A illustrates an example user interface 300 in which one or more content items may be presented to a user 105, in accordance with one or more embodiments. After identifying one or more content items to present to a user 105 via the user interface 300, the centralized document system 110 modifies the user interface 300 to include the one or more content items. The user interface 300 is displayed by a device associated with the user 105. In the illustrated embodiment, two content items (e.g., content item 310 and content item 320) are displayed in the user interface 300. The content items 310, 320 include text and interface elements (i.e., links 315, 325, respectively). The links 315, 325 provide a means for the user 105 to interact with the respective content items.

In one embodiment, the centralized document system 110 determines to present the content items 310, 320 based on an initial cold-start algorithm. For example, content item 310 may be a highest-ranked content item based on a number of matches between user characteristics and content item characteristics associated with content item 310 and content item 320 may be a next highest-ranked content item based on a number of matches between user characteristics and content item characteristics associated with content item 320. The user 105 may interact with (e.g., click on) link 315, link 325, or both during the presentation of the content items 310, 320. When the user 105 interacts with the link(s), interaction data may be stored in the database 120. In some embodiments, in response to either an interaction or no interaction of the user 105 with any of the content items 310, 320 the centralized document system 110 can update a set of training data stored within the database 120, and the machine-learned model selection engine 150 can train or retrain the machine-learned models based on the updated set of training data.

Figure 3B:
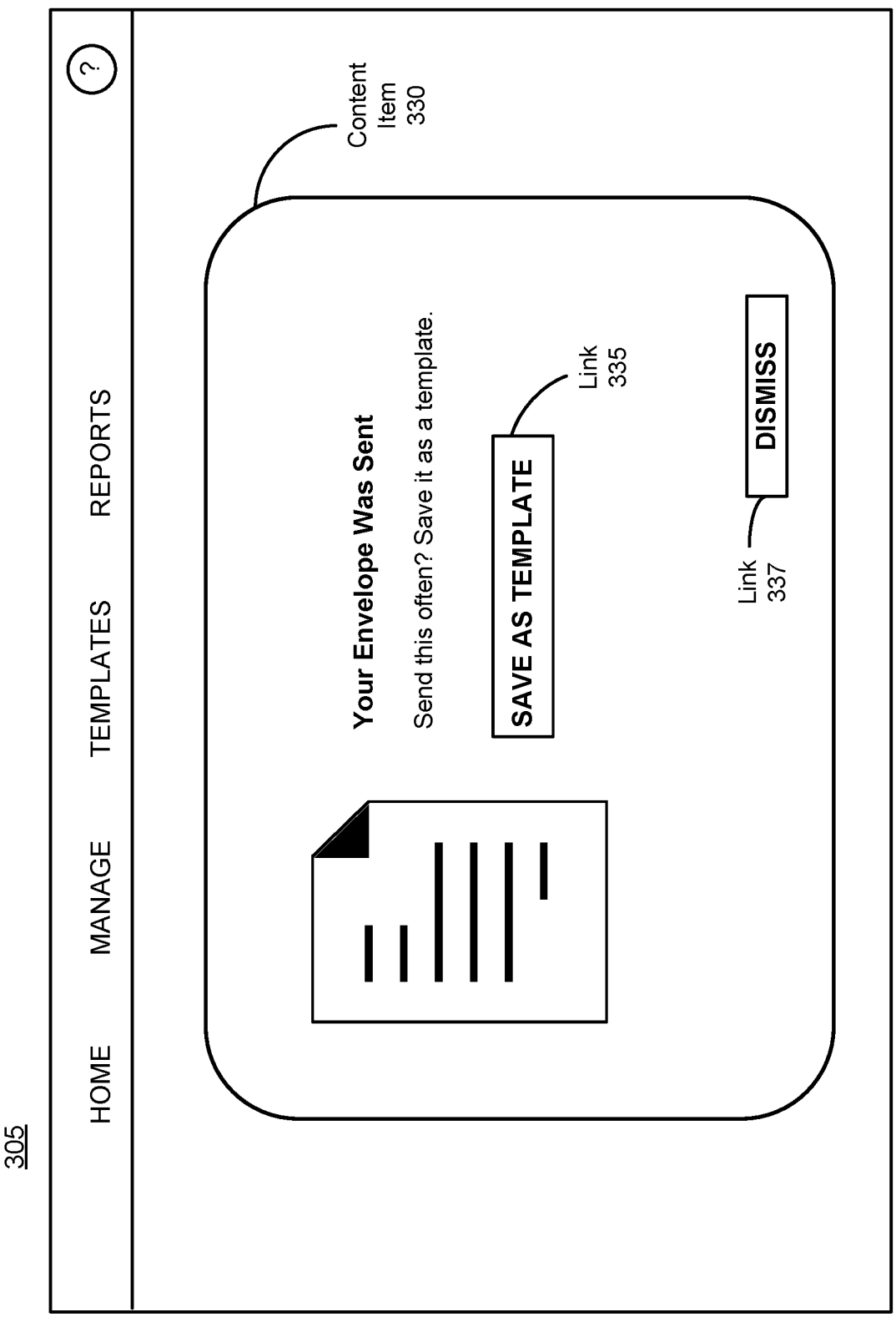
FIG. 3B illustrates another example user interface in which a different content item may be presented to a user, in accordance with one or more embodiments.

FIG. 3B illustrates another example user interface 305 in which a different content item may be presented to the user 105, in accordance with one or more embodiments. The user interface 305 is displayed by a device associated with the user 105. The user interface 305 is substantially similar to the user interface 300 in that a content item 330 is displayed within the user interface 305 to the user 105. The content item 330 includes text and two interface elements (e.g., link 335 and link 337).

In one embodiment, the centralized document system 110 determines to present the content item 330 based on a trained machine-learned model. For example, based on the interaction data gathered by the centralized document system 110 when content items 310, 320 were presented to the user 105 via the user interface 300, the centralized document system 110 utilizes a trained machine-learned model to select and present content item 330 to the user 105 via user interface 305. The user 105 may interact with (e.g., click on) link 335 or link 337 during the presentation of the content item 330. When the user 105 interacts with either link, interaction data may be stored in the database 120. In one example, the user 105 may interact with content item 330 by selecting link 335. This interaction may be stored by the centralized document system 110 in the database 120. In another example, the user 105 may interact with content item 330 by selecting link 337. This interaction may be stored by the centralized document system 110 in the database 120. With one interaction being a positive interaction where the user 105 wanted to 'Save as template' by selecting link 335 and the other interaction being a negative interaction where the user 105 wanted to 'Dismiss' the content item 330, the centralized document system 110 can update the set of training data accordingly. The machine-learned model selection engine 150 can retrain the machine-learned models based on the updated set of training data.

Process for Identifying Content Items for Presentation

Figure 4:
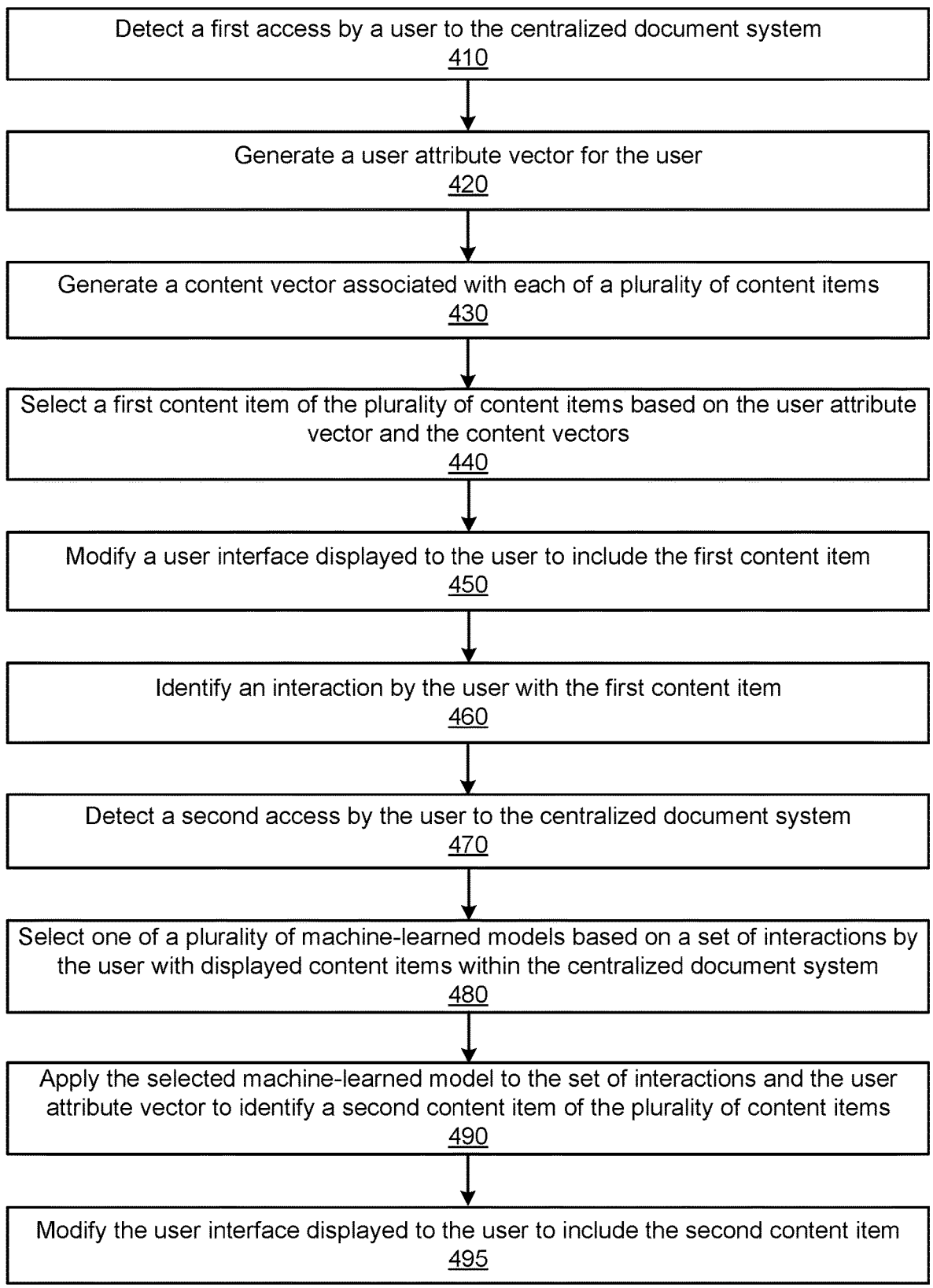
FIG. 4 illustrates an example process for identifying content items for presentation to a user of a centralized document system, in accordance with one or more embodiments.

FIG. 4 illustrates an example process for identifying content items for presentation to a user of a centralized document system, in accordance with one or more embodiments. It should be noted that in other embodiments, the process illustrated by FIG. 4 can include fewer, additional, or different steps than those described herein.

A centralized document system detects 410 a first access by a user to the centralized document system. The user may have not previously accessed the centralized document system. A user can include any entity associated with an account of the centralized document system. For example, a user may be an individual, an employee, an employer, a representative of a company or organization, and the like. In some embodiments, a first access may be a first login to an account of the user to the centralized document system by the user. In some embodiments, a first access may be an account set-up or account initialization performed by the user. In some embodiments, a first access may be a user that has not been targeted previously by the machine-learned model or the initial content item selection engine.

The centralized document system generates 420 a user attribute vector for the user. Each user attribute vector entry corresponds to a characteristic of the user. A characteristic of a user can describe biographical, demographic, and/or geographical information about the user. Characteristics of a user may include a type of the user, a number of individuals or headcount associated with the user 105, expertise of the user 105, services offered by the user 105, an industry or focus associated with the user, software used by the user 105, a state of incorporation or registration of the user 105, cities or states in which the user 105 is present, geographic locations of customers of the user 105, etc.

The centralized document system generates 430 a content vector for each of a plurality of content items. In some embodiments, a content item may be provided to the centralized document system by a content provider. A content item may include graphical widgets, reminders, text, images, video, recommendations, coupons, advertisements, etc. Each content item may include an interface element such as a link and/or a button providing a means for the user to interact with the content item. A content provider may provide other information about the content item to the centralized document system including content item characteristics. Each content vector entry corresponds to a characteristic of an associated content item. Characteristics of a content item may include one or more industries associated with the content item, one or more demographics associated with the content item, one or more expertise associated with the content item, one or more geographic locations associated with the content item, etc.

The centralized document system selects 440 a first content item of the plurality of content items based on the user attribute vector and the content vectors. In some embodiments, an initial cold-start algorithm may be utilized by the centralized document system to select the first content item. For example, during implementation of the initial cold-start algorithm, the centralized document system, for each content vector, determines one or more matches between the user attribute vector entries of the user attribute vector and the content vector entries of the content vector. The centralized document system may rank the plurality of content items based on a number of determined matches. The centralized document system may select a top ranked content item as the first content item. In some embodiments, one or more content vector entries of a content vector are associated with a corresponding weight. For any weighted content vector entry without a matching user attribute vector entry, the centralized document system removes the content vector entry from the content vector before ranking the plurality of content items.

The centralized document system modifies 450 a user interface displayed to the user to include the first content item. The user interface may be displayed on a device associated with the user.

The centralized document system identifies 460 an interaction by the user with the first content item. An interaction is a selection (e.g., by clicking a link, selecting a button, etc.) performed by the user. The centralized document system stores interaction data that corresponds to each interaction performed by the user.

The centralized document system detects 470 a second access by the user to the centralized document system. For example, the user may log into their account some time following their first access to the centralized document system, for instance after a threshold amount of information is learned about the user, after the user has performed a threshold number of interactions with content displayed by the centralized document system, after a threshold number of accesses to a page associated with the centralized document system, and the like.

The centralized document system selects 480 one of a plurality of machine-learned models based on a set of interactions by the user with displayed content items within the centralized document system. The set of interactions includes the identified interaction taken by the user with the first content item. Each machine-learned model is configured to select content items based on one or more of user interactions, user characteristics, and content item characteristics. The centralized document system may select one of the plurality of machine-learned models by determining a predictive performance of each of the plurality of machine-learned models based on the set of interactions by the user with displayed content items within the centralized document system. For example, the centralized document system determines how many content items identified by a machine-learned model the user actually interacts with compared to how many content items were identified by the machine-learned model overall. The centralized document system may select a best performing machine-learned model of the plurality of machine-learned models. The plurality of machine-learned models may include a deep and wide neural network, a deep factorization machine neural network, a graph-based neural network, a reinforcement learning model, and/or any other suitable machine-learned models.

In some embodiments, the machine-learned models may be trained by the centralized document system. For example, the centralized document system accesses a training set of historic data comprising the user attribute vector, the content vectors, and the interaction data. The centralized document system trains the machine-learned models using the training set of historic data to select content items to present to the user. In some embodiments, the centralized document system re-trains the machine-learned models using the user interactions with displayed content items within the centralized document system.

The centralized document system applies 490 the selected machine-learned model to the set of interactions, the user attribute vector, and/or the content item characteristics to identify a second content item of the plurality of content items. The centralized document system modifies 495 the user interface displayed to the user to include the second content item.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability. Embodiments may also include a graphical processing unit as any computing system for increasing computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    detecting, by a centralized document system, a first access by a user to the centralized document system, the user having not previously accessed the centralized document system;
    generating, by the centralized document system, a user attribute vector for the user, each user attribute vector entry corresponding to a characteristic of the user;
    generating, by the centralized document system, a content vector associated with each of a plurality of content items, each content vector entry corresponding to a characteristic of the associated content item;
    selecting, by the centralized document system, a first content item of the plurality of content items based on the user attribute vector and the content vectors;
    modifying, by the centralized document system, a user interface displayed to the user to include the first content item;
    identifying, by the centralized document system, an interaction by the user with the first content item;
    detecting, by the centralized document system, a second access by the user to the centralized document system;

selecting, by the centralized document system, one of a plurality of machine-learned models based on a set of interactions by the user with displayed content items within the centralized document system, the set of interactions including the identified interaction taken by the user with the first content item, each machine-learned model configured to select content items based on user interactions and user characteristics, wherein selecting one of the plurality of machine-learned models comprises:
  determining a predictive performance of each of the plurality of machine-learned models based on the set of interactions by the user with displayed content items within the centralized document system; and
  selecting a best performing machine-learned model of the plurality of machine-learned models;
applying, by the centralized document system, the selected machine-learned model to the set of interactions and the user attribute vector to identify a second content item of the plurality of content items; and
modifying, by the centralized document system, the user interface displayed to the user to include the second content item.

2. The method of claim 1, wherein the plurality of machine-learned models includes one or more of: a deep and wide neural network, a deep factorization machine neural network, a graph-based neural network, and a reinforcement learning model.

3. The method of claim 1, wherein the first access by the user to the centralized document system is a first login to an account of the user after establishing the account with the centralized document system.

4. The method of claim 1, further comprising:
accessing a training set of historic data comprising a historic user attribute vector, historic content vectors, and historic user interactions;
training the plurality of machine-learned models using the training set of historic data to select content items to present to the user; and
re-training the plurality of machine-learned models using the set of interactions by the user with displayed content items within the centralized document system.

5. The method of claim 1, wherein selecting the first content item of the plurality of content items based on the user attribute vector and the content vectors comprises:
for each content vector, determining one or more matches between the user attribute vector entries of the user attribute vector and the content vector entries of the content vector;
ranking the plurality of content items based on a number of determined matches; and
selecting a top ranked content item as the first content item.

6. The method of claim 5, further comprising:
weighting one or more content vector entries of the content vector; and
for any weighted content vector entry without a matching user attribute vector entry, removing the content vector entry from the content vector before ranking the plurality of content items.

7. A non-transitory computer readable storage medium comprising computer executable instructions that when executed by one or more processors causes the one or more processors to perform operations comprising:
detecting, by a centralized document system, a first access by a user to the centralized document system, the user having not previously accessed the centralized document system;
generating, by the centralized document system, a user attribute vector for the user, each user attribute vector entry corresponding to a characteristic of the user;
generating, by the centralized document system, a content vector associated with each of a plurality of content items, each content vector entry corresponding to a characteristic of the associated content item;
selecting, by the centralized document system, a first content item of the plurality of content items based on the user attribute vector and the content vectors;
modifying, by the centralized document system, a user interface displayed to the user to include the first content item;
identifying, by the centralized document system, an interaction by the user with the first content item;
detecting, by the centralized document system, a second access by the user to the centralized document system;
selecting, by the centralized document system, one of a plurality of machine-learned models based on a set of interactions by the user with displayed content items within the centralized document system, the set of interactions including the identified interaction taken by the user with the first content item, each machine-learned model configured to select content items based on user interactions and user characteristics, wherein selecting one of the plurality of machine-learned models comprises:
  determining a predictive performance of each of the plurality of machine-learned models based on the set of interactions by the user with displayed content items within the centralized document system; and
  selecting a best performing machine-learned model of the plurality of machine-learned models;
applying, by the centralized document system, the selected machine-learned model to the set of interactions and the user attribute vector to identify a second content item of the plurality of content items; and
modifying, by the centralized document system, the user interface displayed to the user to include the second content item.

8. The non-transitory computer readable storage medium of claim 7, wherein the plurality of machine-learned models includes one or more of: a deep and wide neural network, a deep factorization machine neural network, a graph-based neural network, and a reinforcement learning model.

9. The non-transitory computer readable storage medium of claim 7, wherein the first access by the user to the centralized document system is a first login to an account of the user after establishing the account with the centralized document system.

10. The non-transitory computer readable storage medium of claim 7, wherein the instructions further cause the processors to perform operations comprising:
accessing a training set of historic data comprising a historic user attribute vector, historic content vectors, and historic user interactions;
training the plurality of machine-learned models using the training set of historic data to select content items to present to the user; and
re-training the plurality of machine-learned models using the set of interactions by the user with displayed content items within the centralized document system.

11. The non-transitory computer readable storage medium of claim 7, wherein selecting the first content item of the plurality of content items based on the user attribute vector and the content vectors comprises:
  for each content vector, determining one or more matches between the user attribute vector entries of the user attribute vector and the content vector entries of the content vector;
  ranking the plurality of content items based on a number of determined matches; and
  selecting a top ranked content item as the first content item.

12. The non-transitory computer readable storage medium of claim 11, wherein the instructions further cause the processors to perform operations comprising:
  weighting one or more content vector entries of the content vector; and
  for any weighted content vector entry without a matching user attribute vector entry, removing the content vector entry from the content vector before ranking the plurality of content items.

13. A computer system comprising:
  one or more computer processors; and
  a non-transitory computer readable storage medium comprising computer executable instructions that when executed by one or more processors causes the one or more processors to perform operations comprising:
    detecting, by a centralized document system, a first access by a user to the centralized document system, the user having not previously accessed the centralized document system;
    generating, by the centralized document system, a user attribute vector for the user, each user attribute vector entry corresponding to a characteristic of the user;
    generating, by the centralized document system, a content vector associated with each of a plurality of content items, each content vector entry corresponding to a characteristic of the associated content item;
    selecting, by the centralized document system, a first content item of the plurality of content items based on the user attribute vector and the content vectors;
    modifying, by the centralized document system, a user interface displayed to the user to include the first content item;
    identifying, by the centralized document system, an interaction by the user with the first content item;
    detecting, by the centralized document system, a second access by the user to the centralized document system;
  selecting, by the centralized document system, one of a plurality of machine-learned models based on a set of interactions by the user with displayed content items within the centralized document system, the set of interactions including the identified interaction taken by the user with the first content item, each machine-learned model configured to select content items based on user interactions and user characteristics, wherein selecting one of the plurality of machine-learned models comprises:
    determining a predictive performance of each of the plurality of machine-learned models based on the set of interactions by the user with displayed content items within the centralized document system; and
    selecting a best performing machine-learned model of the plurality of machine-learned models;
      applying, by the centralized document system, the selected machine-learned model to the set of interactions and the user attribute vector to identify a second content item of the plurality of content items; and
      modifying, by the centralized document system, the user interface displayed to the user to include the second content item.

14. The system of claim 13, wherein the plurality of machine-learned models includes one or more of: a deep and wide neural network, a deep factorization machine neural network, a graph-based neural network, and a reinforcement learning model.

15. The system of claim 13, wherein the instructions further cause the processors to perform operations comprising:
  accessing a training set of historic data comprising a historic user attribute vector, historic content vectors, and historic user interactions;
  training the plurality of machine-learned models using the training set of historic data to select content items to present to the user; and
  re-training the plurality of machine-learned models using the set of interactions by the user with displayed content items within the centralized document system.

16. The system of claim 13, wherein selecting the first content item of the plurality of content items based on the user attribute vector and the content vectors comprises:
  for each content vector, determining one or more matches between the user attribute vector entries of the user attribute vector and the content vector entries of the content vector;
  ranking the plurality of content items based on a number of determined matches; and
  selecting a top ranked content item as the first content item.

17. The system of claim 16, wherein the instructions further cause the processors to perform operations comprising:
  weighting one or more content vector entries of the content vector; and
  for any weighted content vector entry without a matching user attribute vector entry, removing the content vector entry from the content vector before ranking the plurality of content items.

* * * * *